K. E. RUDD.
GATES.
No. 195,538.    Patented Sept. 25, 1877.
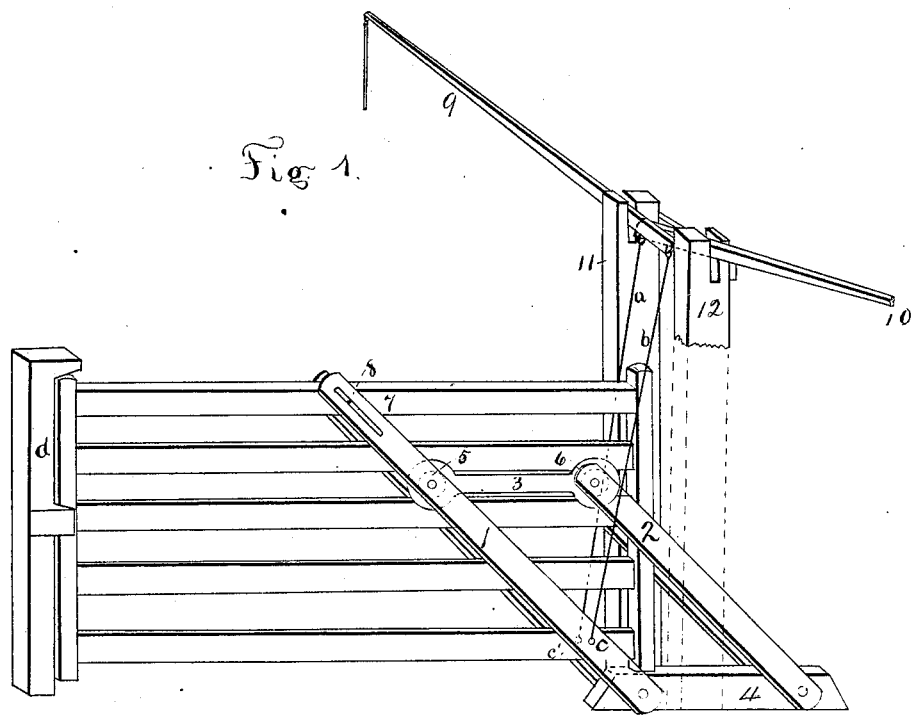
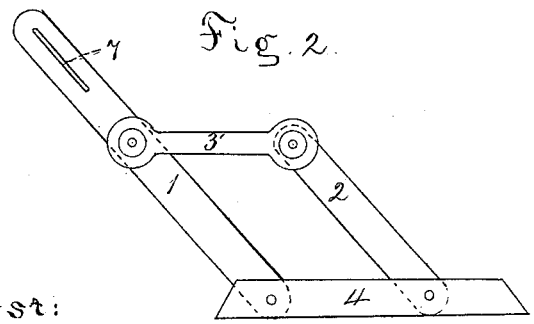
Attest:
O. E. Chapman
C. P. Rudd
Inventor:
Karl E. Rudd

UNITED STATES PATENT OFFICE.

KARL E. RUDD, OF CASSOPOLIS, MICHIGAN.

IMPROVEMENT IN GATES.

Specification forming part of Letters Patent No. 195,538, dated September 25, 1877; application filed September 4, 1877.

*To all whom it may concern:*

Be it known that I, KARL E. RUDD, of Cassopolis, Cass county, Michigan, have invented a new and useful Improvement in Gates, which improvement is fully set forth in the following specification and accompanying drawing.

My invention is an improvement in that class of gates which are supported by parallel pivoted bars, and operated by levers, so that in being opened or closed they move in a vertical plane and in the arc of a circle, or more properly in this case in a parabola.

The improvement consists in the use of wheels or rollers working between two parallel slats of the gate, and connected by a link or connecting-bar, and pivoted to the supporting-bars, thus assisting to maintain the gate in a horizontal position, and regulating the height the gate shall rise when operated. By the arrangement of parts the gate is held firmly in horizontal position when open or closed, and the gate being pivoted near the vertical center, and the inclined bar extending to the top of the gate, prevent the wind from pressing the lower slat of the gate against the parallel supporting-bars as the gate is operated. As the gate starts slightly back before rising, it does not require any latch to prevent hogs or other animals from raising or opening the gate.

Figure 1 is a perspective view of the gate closed. Fig. 2 is a detail view.

The gate is constructed in the ordinary manner, and moves in a vertical plane between posts 11 12.

The gate is supported by means of the inclined parallel bars 1 2 and connecting bars or links 3 3'.

The inclined bars 1 2 are pivoted to block 4 at the base, to the connecting bars and wheels at 5 6. The bar 1 is extended, and has slot 7 cut in it below pin 8.

The height of the gate may be changed by changing wheels 5 6 to a higher or lower bar.

As the gate is being opened the wheels 5 6 roll forward between the bars of the gate guided by bars 3 3', and the upper end of supporting-bar 1, acting on pin 8 in the slot 7, draws the gate back as the opening-lever is lowered, until the center is reached, when the weight of the gate carries it the balance of the distance required to open or close it.

The gate is shifted by levers 9 10 pivoted through the top of posts 11 12 and rods $a$ $b$, connecting them to the inclined bar 1 at $c$ $c'$. The latch-post $d$ is provided with projections at the side and top, to hold the gate firmly in vertical position when closed.

Having thus described my invention, what I claim as new, and desire to secure by Letters Patent, is—

The combination, in a gate, of connecting-bars 3 3', wheels 5 6, supporting-bars 1 2 with slot 7, the whole being connected and pivoted substantially as described.

KARL E. RUDD.

Witnesses:
O. E. CHAPMAN,
C. P. RUDD.